United States Patent [19]

Fukushima et al.

[11] Patent Number: 5,732,204

[45] Date of Patent: Mar. 24, 1998

[54] METHOD AND DEVICE FOR 3D IMAGE PROCESSING

[75] Inventors: Masanobu Fukushima, Sanda; Tatsuya Fujii, Nishinomiya; Naoto Shiraishi, Toyonaka; Yasuhiro Izawa, Sanda; Tatsuya Nakajima, Toyonaka, all of Japan

[73] Assignee: Ricoh Company, Ltd., Tokyo, Japan

[21] Appl. No.: 835,807

[22] Filed: Apr. 16, 1997

Related U.S. Application Data

[63] Continuation of Ser. No. 381,102, Jan. 31, 1995, abandoned.

[30] Foreign Application Priority Data

Feb. 1, 1994 [JP] Japan .................................. 6-010323

[51] Int. Cl.$^6$ ........................................... G06F 3/14
[52] U.S. Cl. ........................................... 395/127
[58] Field of Search .................................. 395/118, 119, 395/127, 129; 382/154, 298, 299

[56] References Cited

U.S. PATENT DOCUMENTS

| | | | |
|---|---|---|---|
| 5,058,186 | 10/1991 | Miyaoka et al. | 382/154 |
| 5,268,677 | 12/1993 | Frasier et al. | 395/127 X |
| 5,282,051 | 1/1994 | Walker | 382/299 X |
| 5,418,626 | 5/1995 | Semasa | 382/298 X |
| 5,467,404 | 11/1995 | Vuylsteke et al. | 382/299 X |
| 5,513,276 | 4/1996 | Theodoracatos | 382/154 |

*Primary Examiner*—Phu K. Nguyen
*Assistant Examiner*—Cliff N. Vo
*Attorney, Agent, or Firm*—Cooper & Dunham LLP

[57] ABSTRACT

A method for coordinate transformation is presented to perform world coordinate transformation for placing a 3D model in world coordinates and to perform view transformation for spatially relating the 3D model with a viewpoint. The method includes the steps of performing a contraction process on the 3D model at a time of the world coordinate transformation, so that a size of the 3D model is made smaller than an actual size thereof, and performing a viewpoint position transformation on the viewpoint at a time of the view transformation, so that shift of the viewpoint is made smaller than an actual shift in accordance with a degree of contraction of the contraction process.

10 Claims, 5 Drawing Sheets

METHOD AND DEVICE FOR 3D IMAGE PROCESSING

This is a continuation of application Ser. No. 08/381,102 filed Jan. 31, 1995, now abandoned.

BACKGROUND OF THE INVENTION

1. Field of the Invention

The present invention generally relates to methods and devices for coordinate transformation, and more particularly relates to a method and a device for coordinate transformation used in 3D (three dimensional) graphics processing.

2. Description of the Prior Art 3D graphics processing systems using polygon data have been developed in the prior art.

As an example of such a system, FIG. 1 schematically shows a block diagram of a 3D graphics system whose real-time characteristic is required in a 3D graphic game and the like. This system includes a 3D graphics unit 3, a CPU (central processing unit) 6, a polygon data storage memory 7, and a display 8. Here, the 3D graphics unit 3 includes a 3D coordinate transformation unit 4 and a drawing unit 5, which are controlled by the CPU 6. Under the control of the CPU 6, a coordinate transformation process and a drawing process are performed on polygon data which is read out from the polygon data storage memory 7. A resulting image whose two dimensional data is transformed from a 3D space is displayed on the display 8.

FIG. 2 shows a block diagram of the 3D coordinate transformation unit 4 of FIG. 1. In FIG. 2, the 3D coordinate transformation unit 4 of FIG. 1 includes a world coordinate transformation unit 4a, a view transformation unit 4b, and a perspective transformation unit 4c. Functions of each of those elements will be described below.

The world coordinate transformation unit 4a receives polygon data, which represents individual objects in modeling coordinates, from the polygon data storage memory 7 of FIG. 1. Then, it performs world coordinate transformation on the polygon data. The world coordinate transformation is a transformation which positions the polygon data in world coordinates (x, y, z), and can be expressed by the following coordinate transformation equations.

$$x_W = (x + x_M)$$
$$y_W = (y + y_M)$$
$$z_W = (z + z_M)$$

Here, $(x_M, y_M, z_M)$ are modeling coordinates of the polygon data, and $(x, y, z)$ represent the world coordinates in which the above modeling coordinates are positioned. Also, $(x_W, y_W, z_W)$ represent 3D coordinates of the polygon data which are arranged in the world coordinates.

The view transformation unit 4b receives the polygon data in the world coordinates from the world coordinate transformation unit 4a, and performs view transformation on it. The view transformation transforms the 3D model (polygon data) represented in the world coordinates into viewpoint coordinates $(x_E, y_E, z_E)$, which are defined by a selected viewpoint $(x_C, y_C, z_C)$ and a view direction. This transformation is comprised of a viewpoint shift and rotations of coordinate axes, which are expressed by the following transformation equations.

[viewpoint shift]

$$x_1 = x - x_C$$
$$y_1 = y - y_C$$
$$z_1 = z - z_C$$

[y axis rotation]

$$x_2 = \cos \beta \cdot x_1 - \sin \beta \cdot z_1$$
$$y_2 = y_1$$
$$z_2 = \sin \beta \cdot x_1 + \cos \beta \cdot z_1$$

[x axis rotation]

$$x_3 = x_2$$
$$y_3 = \cos \alpha \cdot y_2 + \sin \alpha \cdot z_2$$
$$z_3 = -\sin \alpha \cdot y_2 + \cos \alpha \cdot z_2$$

[z axis rotation]

$$x_E = \cos \tau \cdot x_3 + \sin \tau \cdot y_3$$
$$y_E = -\sin \tau \cdot x_3 + \cos \tau \cdot y_3$$
$$z_E = z_3$$

Here, each of the sine functions and the cosine functions is a rotation parameter, which is derived from the viewpoint and the view direction with regard to the x axis, the y axis, and the z axis.

The perspective transformation unit 4c receives the 3D model represented in the viewpoint coordinates, and performs a perspective transformation process on it. The perspective transformation projects in a perspective manner the 3D model onto a screen, which is arranged in the viewpoint coordinates $(x_E, y_E, z_E)$. Assuming that the viewpoint is located at the origin of the viewpoint coordinates and the view direction is toward a positive z coordinates in a z axis direction, perspective coordinates are obtained by the following equations.

$$x_S = SD \cdot x/z$$
$$y_S = SD \cdot y/z$$

Here, SD is a distance between the viewpoint and the screen.

In this manner, 3D coordinate transformation can be performed mainly by addition and subtraction operations and multiplication operations, including division operations in a fewer appearances.

FIG. 3 shows a block diagram of a circuit which performs addition, subtraction, multiplication, and division operations. In FIG. 5, the circuit includes a data register 11 storing polygon data, addition and subtraction device 12, a multiplication device 13, a division device 14, and input latches 15 temporarily holding data.

In systems which perform coordinate transformation in real time for 3D video games and the like, coordinates are represented by 16 bit integers, 32 bit integers, or floating point representations in order to express 3D space.

The use of floating point representations makes it possible to implement a large 3D space. However, the use of floating point representations leads to an increase in a processing time for coordinate transformation. This makes smaller the number of polygons which can be processed within one video frame interval.

On the other hand, the use of 16 bit integers or 32 bit integers means that the processing time for coordinate transformation can be shorter. However, it also means that 3D space represented by those integers becomes small, which leads to a difficulty in controlling objects in the 3D space, for example, at the time of developing 3D video games and the like. This is because a small 3D space increases a likelihood of overflow in calculations of coordinate transformation. In real-time systems, a process for recovering from overflow cannot be incorporated, since the recovering process takes too much time.

Furthermore, such a small 3D space makes it difficult to incorporate enough depth appearance on a display.

Accordingly, there is a need in the field of coordinate transformation for a method and a device for coordinate transformation which can process a large number of polygons by using integers or fixed points for representing coordinates, and can incorporate enough depth appearance on a display by virtually expanding the space.

SUMMARY OF THE INVENTION

Accordingly, it is a general object of the present invention to provide a method and a device which can satisfy the need described above.

It is another and more specific object of the present invention to provide a method for coordinate transformation which can process a large number of polygons by using integers or fixed points for representing coordinates, and can incorporate enough depth appearance on a display by virtually expanding the space.

In order to achieve the above objects according to the present invention, a method for coordinate transformation which performs world coordinate transformation for placing a 3D model in world coordinates and performs view transformation for spatially relating the 3D model with a viewpoint includes the steps of performing a contraction process on the 3D model at a time of the world coordinate transformation, so that a size of the 3D model is made smaller than an actual size thereof, and performing a viewpoint position transformation on the viewpoint at a time of the view transformation, so that shift of the viewpoint is made smaller than an actual shift in accordance with a degree of contraction of the contraction process.

Also, in order to achieve the above objects according to the present invention, a device for coordinate transformation which performs world coordinate transformation for placing a 3D model in world coordinates and performs view transformation for spatially relating the 3D model with a viewpoint includes an addition and subtraction unit performing an addition operation and a subtraction operation, a multiplication unit performing a multiplication operation, a division unit performing a division operation, wherein the addition and subtraction unit, the multiplication unit, and the division unit cooperate to perform the world coordinate transformation and the view transformation, and a register storing the 3D model, wherein the division unit performs a contraction process on the 3D model at a time of the world coordinate transformation so as to make a size of the 3D model smaller than an actual size thereof, and performs a viewpoint position transformation on the viewpoint at a time of the view transformation so as to make shift of the viewpoint smaller than an actual shift in accordance with a degree of contraction of the contraction process.

In the method and the device according to the present invention, the 3D model can be virtually positioned at a distance beyond the limit of space representation. This leads to a space virtually expanded. Thus, enough depth appears on a display to make video images having a larger impact. Also, there is no need for floating point representation for expressing coordinates, so that a large number of polygons can be processed in a shorter time.

Other objects and further features of the present invention will be apparent from the following detailed description when read in conjunction with the accompanying drawings.

BRIEF DESCRIPTION OF THE DRAWINGS

FIG. 1 is a block diagram of a 3D graphics system whose real-time characteristic is required in 3D graphic games and/the like;

DESCRIPTION OF THE PREFERRED EMBODIMENTS

In the following, an embodiment of the present invention will be described with reference to the accompanying drawings.

A method for coordinate transformation according to an embodiment of the present invention uses integers or fixed point representations for expressing 3D model data (polygon data) and coordinates. The method moves the 3D model within space by applying the world coordinate transformation, the view transformation, and the perspective transformation in this order.

According to the present invention, the method performs a contraction process on the 3D model data at the time of the world coordinate transformation. Thus, the 3D models can be treated in sizes smaller than their actual sizes. Then, the method performs a viewpoint position transformation on the 3D model data at the time of the view transformation. Thus, a shift of the viewpoint is made smaller than really it is, in order to match with the degree of the contraction.

As will be described later, the contraction process and the viewpoint position transformation are implemented by bit shift operations of the polygon data and the viewpoint position data at the time of addition and subtraction operations.

Figure 4:
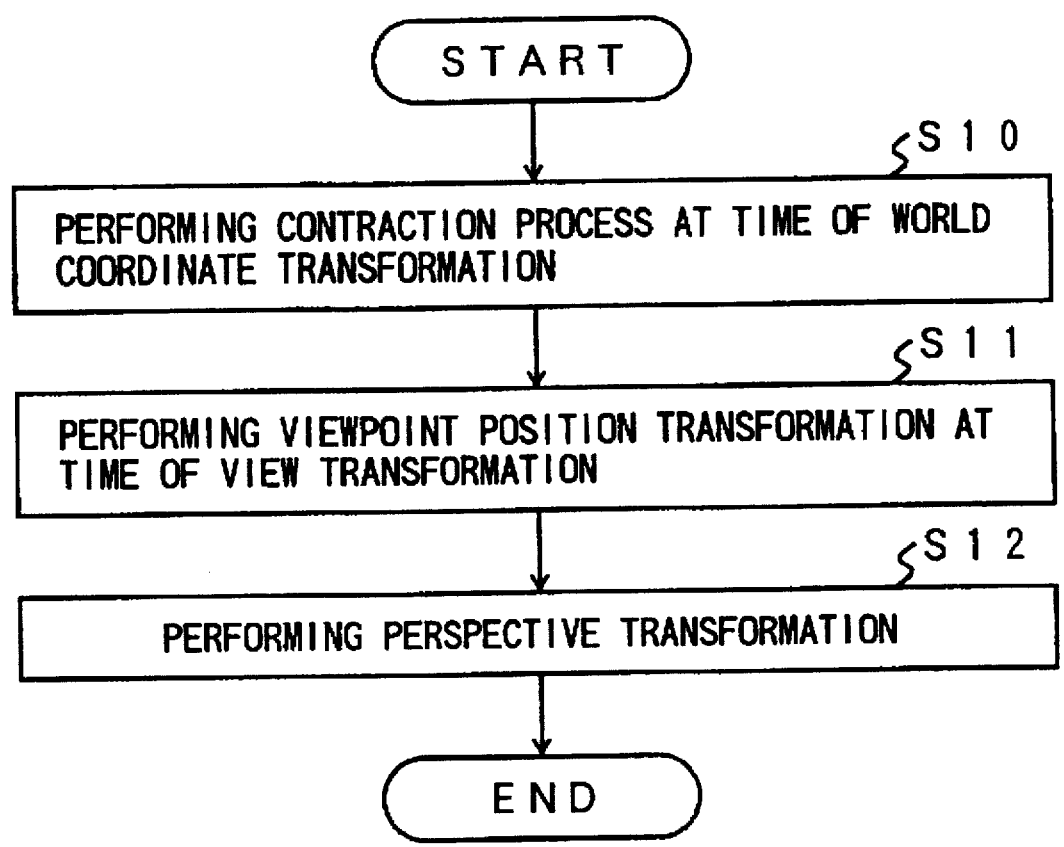
FIG. 4 is a flow-chart of an embodiment of a coordinate transformation process according to the present invention.

FIG. 4 is a flow-chart of the embodiment of a coordinate transformation process according to the present invention. In the process of FIG. 4, the 3D model (polygon data) is subject to the coordinate transformation so as to be represented by perspective coordinates in the end.

[Contraction Process]

At a step S10 in FIG. 4, the polygon data is subject to the contraction process at the time of the world coordinate transformation, so as to be treated in a smaller size than really it is. This process is carried out by the following equations. (The same symbols as in the previous equations are used here.)

$$x_W = (x + x_M/2^n)$$

$$y_W = (y + y_M/2^n)$$

$$z_W = (z + z_M/2^n)$$

Here, n signifies an amount of bit shift to the right. When n is equal to 1, $(x_M, Y_M, z_M)$ are all made half. Thus, the 3D models are arranged in the world coordinates, while their sizes are contracted as if they were positioned two times as far as they are. When n is equal to 2, the 3D models are arranged in the world coordinates, having sizes contracted as if positioned four times as far.

[Viewpoint Position Transformation]

At a step S11 in FIG. 4, the viewpoint position transformation is performed at the time of the view transformation so as to make a shift of the viewpoint smaller than really it is, in accordance with the degree of the contraction.

$$x_1 = x - x_c/2^n$$

$$y_1 = y - y_c/2^n$$

$$z_1 = z - z_c/2^n$$

Here, n is the same as before, i.e., an amount of bit shift to the right. When n is equal to 1, $(x_c, y_c, z_c)$ are all divided by 2. Thus, the shift of the viewpoint becomes half an actual amount. In the same manner, when n is equal to 2, the shift of the viewpoint becomes one fourth of an actual shift amount.

As for rotations around the x, y, and z axes and the perspective transformation, the same operations as in the prior art are employed at a step S11 and a step S12, respectively.

Figure 5:
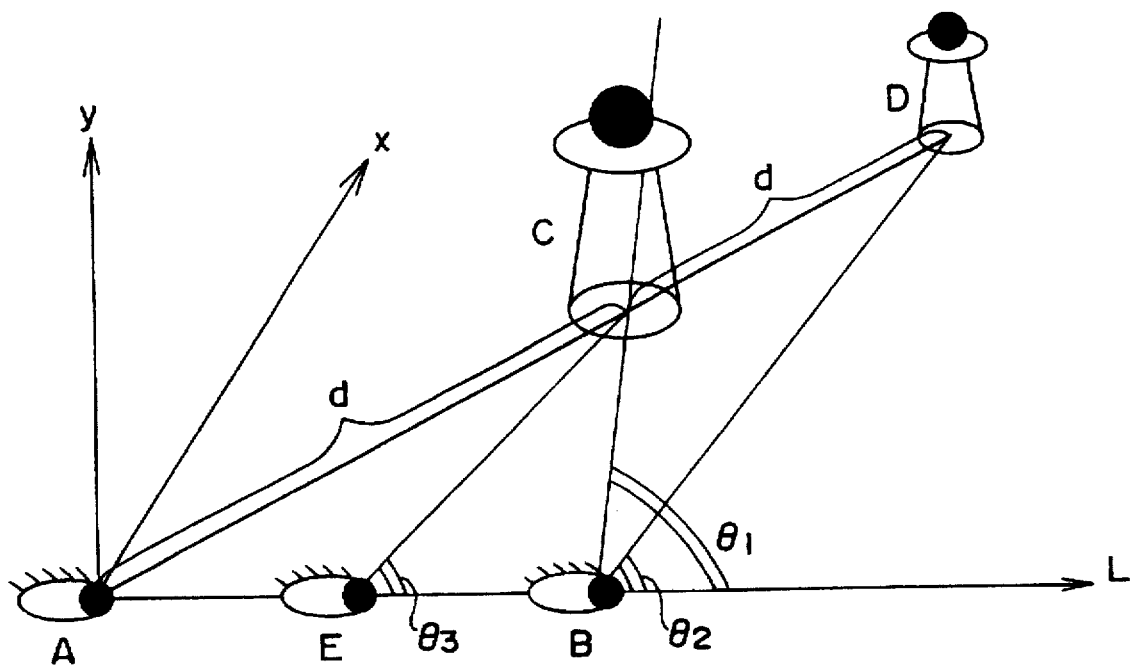
FIG. 5 is an illustrative drawing showing a 3D model arranged in the world coordinates, in which a contraction process and a viewpoint position transformation of FIG. 4 are applied.

FIG. 5 shows a 3D model arranged in the world coordinates, in which the contraction process and the viewpoint position transformation are applied, so that the 3D model is located at a distance two times (n=1) as far as an actual distance.

In FIG. 5, a spatial relation between the viewpoint and the 3D model as its original data represents is shown as a relation between a viewpoint position A and a 3D model position C. When the viewpoint is moved to a position B, a spatial relation between the viewpoint and the 3D model is represented by a relation between the position B and the position C. In this case, a view angle at which the 3D model is observed is $\Theta_1$ relative to an axis L.

When the viewpoint is moved from the position A to the position B, the view angle to look at the 3D model becomes $\Theta_1$, as mentioned above. However, if the 3D model is to appear as if it was placed at a position D, a view angle to look at the 3D model from the position B must be at an angle $\Theta_2$. When the 3D model is subject only to a contraction process, it is placed at the position C so that the 3D model does not appear at the view angle $\Theta_2$.

In order to have the view angle of $\Theta_2$, a viewpoint is shifted in a viewpoint position transformation process so as to be located at a position E between the positions A and B. From this viewpoint at the position E, the contracted 3D model can be observed at a view angle $\Theta_3$, which is equal to the view angle $\Theta_2$. Thus, a spatial relation equivalent to that between the viewpoint B and the position D can be obtained between the viewpoint E and the contracted 3D model at the position C. In this situation, the 3D model appears as if it was placed at a desired distance.

Figure 1:
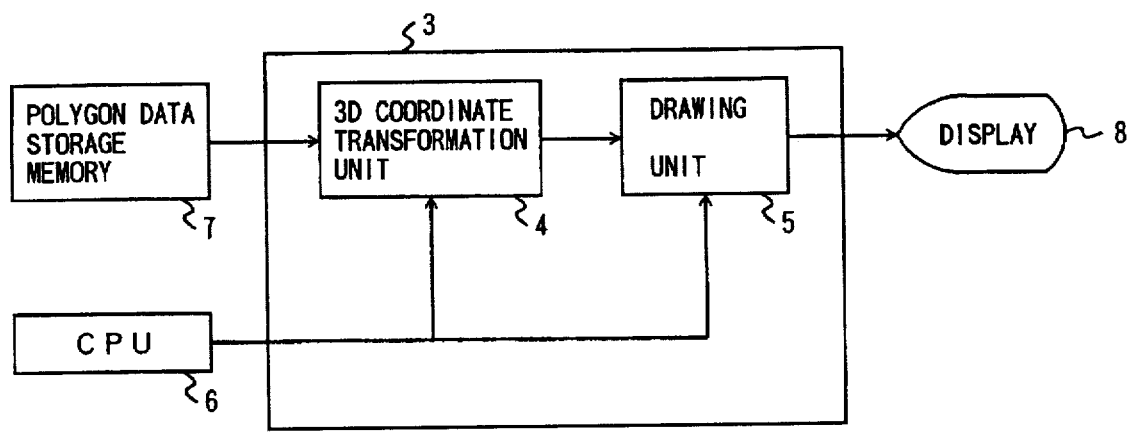
Figure 2:
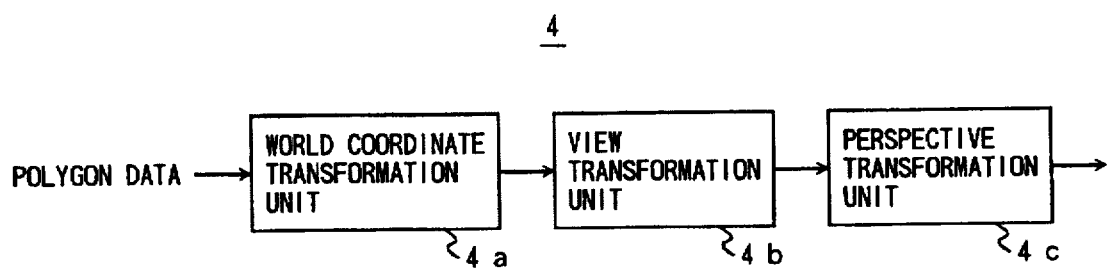
FIG. 2 is a block diagram of a 3D coordinate transformation unit of FIG. 1.
Figure 3:
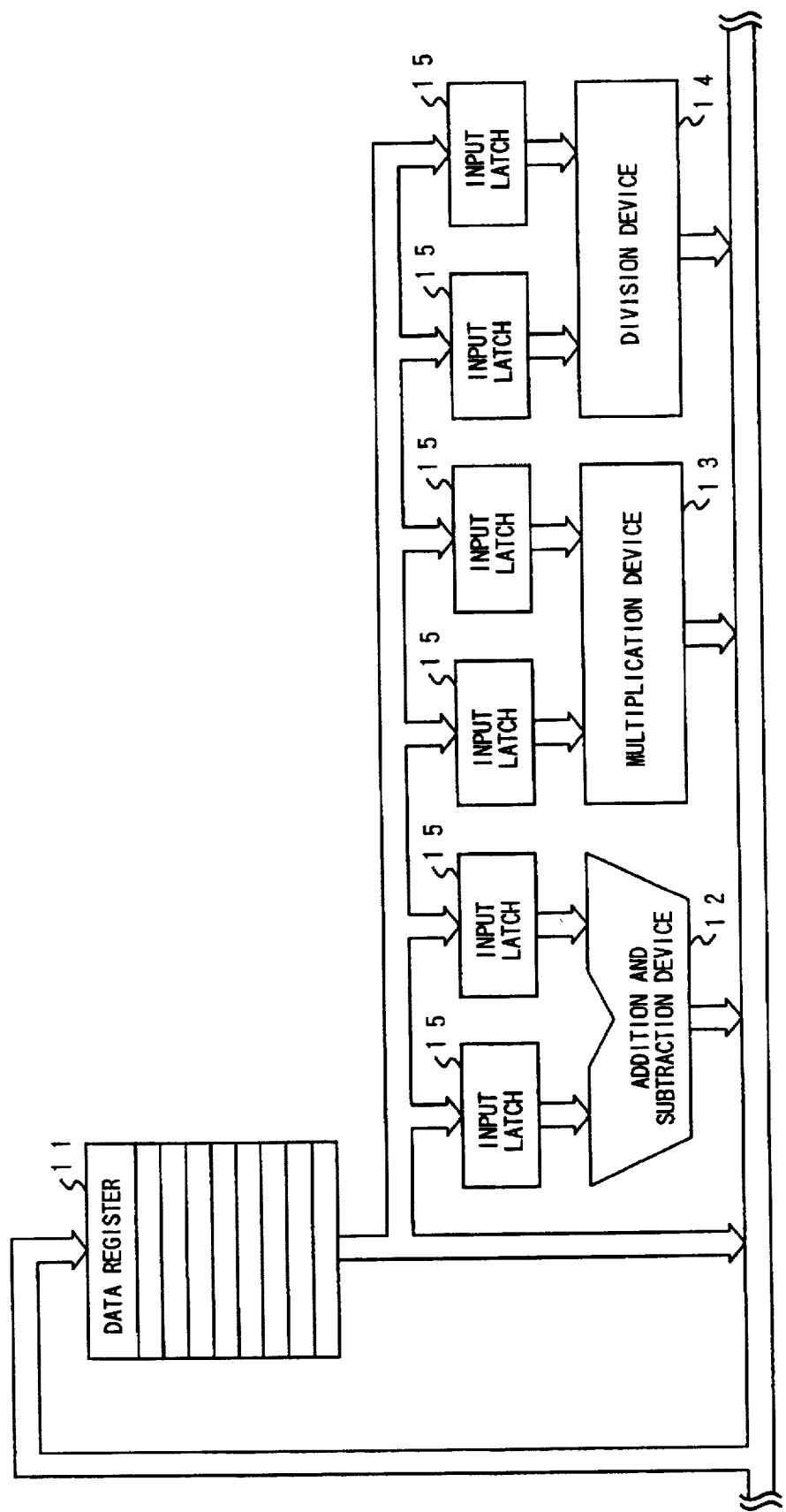
FIG. 3 is a block diagram of a circuit which performs addition, subtraction, multiplication, and division operations for 3D coordinate transformation.
Figure 6:
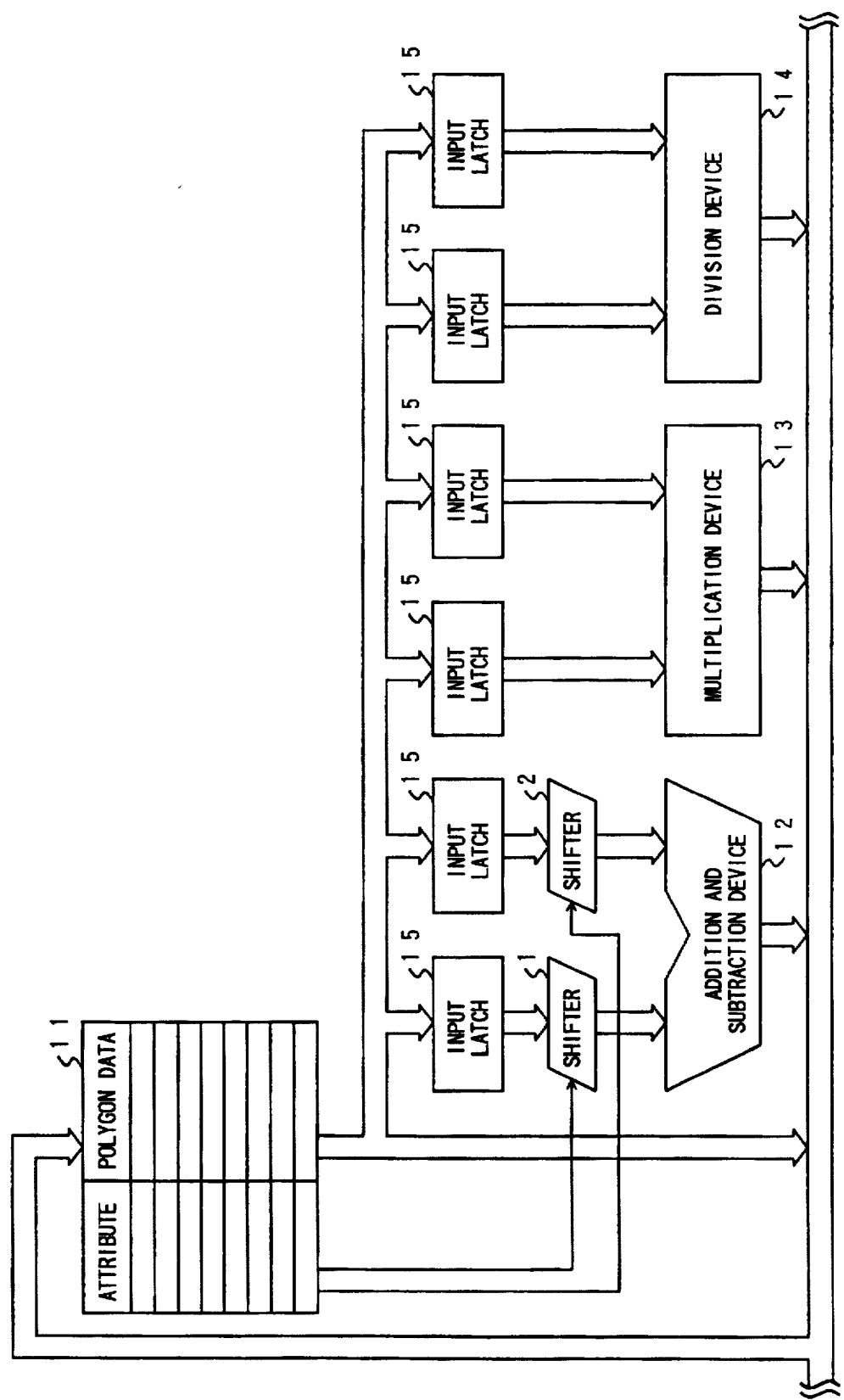
FIG. 6 is a block diagram of a circuit which performs addition, subtraction, multiplication, and division operations on polygon data for the coordinate transformation according to the embodiment of the present invention.

FIG. 6 is a block diagram of a circuit which performs addition, subtraction, multiplication, and division operations on the polygon data for coordinate transformation. The circuit of FIG. 6 differs from that of FIG. 3 only in shifters 1 and 2 and attribute data stored in the data register 11. The shifters 1 and 2 perform bit shift operations on the polygon data and the viewpoint position data at the time of the world coordinate transformation and the view transformation.

The attribute data of the polygon data is stored in the data register 11, so that the bit shift operations by the shifters 1 and 2 can be carried out selectively based on the attribute data.

As described above, the coordinate transformation according to the present invention first performs a contraction process on the polygon data so as to treat the 3D model as a smaller object than really it is, and, then, performs the viewpoint position transformation in order to have a smaller 3D model movement in accordance with the degree of the contraction. Thus, the 3D model can be arranged virtually at a farther distance, so that the 3D model can appear as if it was placed beyond the limit of the space representation. In other words, the space can be virtually expanded. This leads to an enough depth appearance on the display and to a video image having more impact. This can be done by using an integer data format or a fixed point data format, without a need for a floating point representation. Thus, a large number of polygons can be processed in a shorter time.

The contraction process and the viewpoint position transformation can be performed by using division operations at the time of the world coordinate transformation and the view transformation. However, the bit shift operations by the shifters 1 and 2 as in this embodiment can perform the process and the transformation at a faster speed. Here, the shifters 1 and 2 can be configured so as to be capable of shifting to the left, thus providing a capacity to enlarge the 3D model for an object transformation.

The bit shift operations are carried out selectively based on the attribute data of the 3D model data. Thus, for example, the coordinate transformation can be applied only once in a plurality of image frames for such data as background data, which has a small effect on the motion appearance of moving pictures. This leads to a more effective use of processing time, providing an extra computation power to calculate a larger number of polygons. Also, the process of selectively performing the bit shift operations may be based on program data instead of the attribute data.

As described above, according to the present invention, a large number of polygons can be processed in a shorter time by using an integer or fixed point representation, and, at the same time, enough depth appearance can be implemented on a display by virtually expanding the space. Also, the bit shift operations can realize the contraction process and the viewpoint position transformation at a high speed. Furthermore, the selective bit shift operations can further make the processing speed faster.

Further, the present invention is not limited to these embodiments, but various variations and modifications may be made without departing from the scope of the present invention.

What is claimed is:

1. A method for coordinate transformation which performs world coordinate transformation for placing a 3D model in world coordinates and performs view transformation for spatially relating said 3D model with a viewpoint, said method comprising the steps of:

performing a contraction process on said 3D model at a time of said world coordinate transformation, so that a size of said 3D model is made smaller than an actual size thereof in order to make said 3D model appear farther from said viewpoint than an actual distance of said 3D model; and performing a viewpoint position transformation on said viewpoint at a time of said view transformation, so that a shift of said viewpoint is made smaller than an actual shift in accordance with a degree of contraction of said contraction process in order to make said 3D model exhibit an appropriate shift relative to said viewpoint as if said 3D model was located farther from said viewpoint than the actual distance.

2. The method as claimed in claim 1, wherein said 3D model is represented in a data format using integer representation or fixed point representation.

3. The method as claimed in claim 2, wherein said contraction process and said viewpoint position transformation are carried out by using bit shift operations.

4. The method as claimed in claim 3, wherein said bit shift operations are selectively performed based on attribute data accompanying said 3D model.

5. The method as claimed in claim 3, wherein said bit shift operations are selectively performed based on program data.

6. A device for coordinate transformation which performs world coordinate transformation for placing a 3D model in world coordinates and performs view transformation for spatially relating said 3D model with a viewpoint, said device comprising:

addition and subtraction units performing an addition operation and a substraction operation, respectively;

a multiplication unit performing a multiplication operation;

a division unit performing a division operation, wherein said addition and subtraction units, said multiplication unit, and said division unit cooperate to perform said world coordinate transformation and said view transformation; and a register storing said 3D model, wherein said division unit performs a contraction process on said 3D model at a time of said world coordinate transformation so as to make a size of said 3D model smaller than an actual size thereof in order to make said 3D model appear farther from said viewpoint than an actual distance of said 3D model, and performs a viewpoint position transformation on said viewpoint at a time of said view transformation so as to make a shift of said viewpoint smaller than an actual shift in accordance with a degree of contraction of said contraction process in order to make the 3D model exhibit an appropriate shift relative to said viewpoint as if said 3D model was located farther from said viewpoint than the actual distance.

7. The device as claimed in claim 6, wherein said 3D model is represented in a data format using integer representation or fixed point representation.

8. A device for coordinate transformation which performs world coordinate transformation for placing a 3D model in world coordinates and performs view transformation for spatially relating said 3D model with a viewpoint, said device comprising:

addition and subtraction units performing an addition operation and a subtraction operation, respectively;

a multiplication unit performing a multiplication operation;

a division unit performing a division operation, wherein said addition and subtraction units, said multiplication unit, and said division unit cooperate to perform said world coordinate transformation and said view transformation;

a register storing said 3D model; and shifters performing bit shift operations for a contraction process on said 3D model at a time of said world coordinate transformation so as to make a size of said 3D model smaller than an actual size thereof in order to make said 3D model appear farther from said viewpoint than an actual distance of said 3D model, and performing bit shift operations for a viewpoint position transformation on said viewpoint at a time of said view transformation so as to make a shift of said viewpoint smaller than an actual shift in accordance with a degree of contraction of said contraction process in order to make said 3D model exhibit an appropriate shift relative to said viewpoint as if said 3D model was located farther from said viewpoint than the actual distance.

9. The device as claimed in claim 8, wherein said 3D model is represented in a data format using integer representation or fixed point representation.

10. The device as claimed in claim 9, wherein said bit shift operations are selectively performed based on attribute data accompanying said 3D model.

* * * * *